US008779084B2

(12) United States Patent
Liu et al.

(10) Patent No.: US 8,779,084 B2
(45) Date of Patent: Jul. 15, 2014

(54) PROCESS FOR PRODUCING POLYETHER-POLYESTER BLOCK COPOLYMER

(75) Inventors: Zhaoquing Liu, Shanghai (CN); Daobing Lin, Shanghai (CN); Qiaobo Li, Shanghai (CN)

(73) Assignee: Solvay (China) Co., Ltd., Shanghai (CN)

( * ) Notice: Subject to any disclaimer, the term of this patent is extended or adjusted under 35 U.S.C. 154(b) by 0 days.

(21) Appl. No.: 13/319,859

(22) PCT Filed: Jul. 1, 2009

(86) PCT No.: PCT/CN2009/072575
§ 371 (c)(1), (2), (4) Date: Nov. 10, 2011

(87) PCT Pub. No.: WO2011/000158
PCT Pub. Date: Jan. 6, 2011

(65) Prior Publication Data

US 2012/0059185 A1 Mar. 8, 2012

(51) Int. Cl.
*C08G 63/66* (2006.01)

(52) U.S. Cl.
USPC ........... 528/300; 528/272; 528/279; 528/308; 528/308.3

(58) Field of Classification Search
USPC ......... 528/271, 272, 279, 300, 304, 305, 308, 528/308.1, 308.3, 308.5, 308.6
See application file for complete search history.

(56) References Cited

U.S. PATENT DOCUMENTS

| | | | | |
|---|---|---|---|---|
| 2,597,643 | A | 5/1952 | Izard et al. | |
| 3,416,952 | A | 12/1968 | Robertson et al. | |
| 4,049,629 | A * | 9/1977 | Pawlak et al. | 528/195 |
| 4,349,688 | A | 9/1982 | Sandler | |
| 4,613,664 | A | 9/1986 | Tate et al. | |
| 4,702,857 | A | 10/1987 | Gosselink | |
| 4,738,787 | A | 4/1988 | O'Lenick | |
| 4,877,896 | A | 10/1989 | Maldonado | |
| 5,296,586 | A | 3/1994 | Burch et al. | |
| 5,786,318 | A | 7/1998 | Blokzijl et al. | |
| 6,107,443 | A | 8/2000 | DeSimone et al. | |
| 6,153,723 | A | 11/2000 | Lang et al. | |
| 7,144,632 | B2 * | 12/2006 | Hayes | 428/423.7 |
| 2006/0235187 | A1 | 10/2006 | McKenna et al. | |

FOREIGN PATENT DOCUMENTS

| | | |
|---|---|---|
| EP | 0 752 468 | 1/1997 |
| EP | 0 964 015 | 12/1999 |
| WO | 92/17523 | 10/1992 |

* cited by examiner

*Primary Examiner* — Frances Tischler
(74) *Attorney, Agent, or Firm* — Cesari and McKenna, LLP

(57) ABSTRACT

The present invention discloses a process for producing a polyether-polyester block copolymer with a di(C 1-C 4)alkyl ester of aromatic dicarboxylic acid, an aliphatic diol or aliphatic polyol and a polyether having at least one terminal hydroxyl group in an inert solvent. In the present invention, the inert solvent 5 is used to prevent the di(C 1-C 4)alkyl ester of aromatic dicarboxylic acid from sublimation instead of excessive polyol, such that the subsequent removal of excessive polyol under high temperature and high vacuum is avoided.

22 Claims, No Drawings

PROCESS FOR PRODUCING POLYETHER-POLYESTER BLOCK COPOLYMER

CROSS REFERENCE TO RELATED APPLICATIONS

This application claims the priority of International Application No. PCT/CN2009/072575, filed on Jul. 1, 2009, the contents of which is incorporated herein by reference.

FIELD OF THE INVENTION

The present invention relates to a process for producing a polyether-polyester block copolymer. Particularly, the present invention relates to a process for producing a polyether-polyester block copolymer with a di($C_1$-$C_4$)alkyl ester of aromatic dicarboxylic acid, an aliphatic diol or aliphatic polyol and a polyether having at least one terminal hydroxyl group in an inert solvent. The present invention also relates to the polyether-polyester block copolymer produced by the process and the use thereof.

BACKGROUND OF THE INVENTION

Polyether-polyester block copolymers have been used in fabric mill treatment and in both powder and liquid detergents as soil releasing polymers (SRP). For example, polyethylene terephthalate/polyoxyethylene terephthalate (PET/POET) and its variants are used as soil release agents in liquid detergent compositions. These copolymers are described in U.S. Pat. Nos. 3,416,952, 4,349,688, 4,702,857, 4,877,896, 4,738,787, and 5,786,318 etc.

A conventional process for producing such a copolymer employs an aromatic dicarboxylic acid dialkylester and an aliphatic diol as key raw materials. This process usually requires the presence of excessive diol such as ethylene glycol or propylene glycol which is used as a solvent to prevent the aromatic dicarboxylic acid dialkylester from sublimation. However, the subsequent removal of excessive diol in order to carry out condensation reaction requires high temperature and very low pressure for an extended reaction time as the boiling point of the diol is high and the diol residue is bonded covalently to the aromatic dicarboxylic acid by an ester bond. An example is shown below, starting with dimethyl terephthalate (DMT) to produce a triblock copolymer of polyethylene terephthalate end-capped with methoxy polyethylene glycol (MPEG):

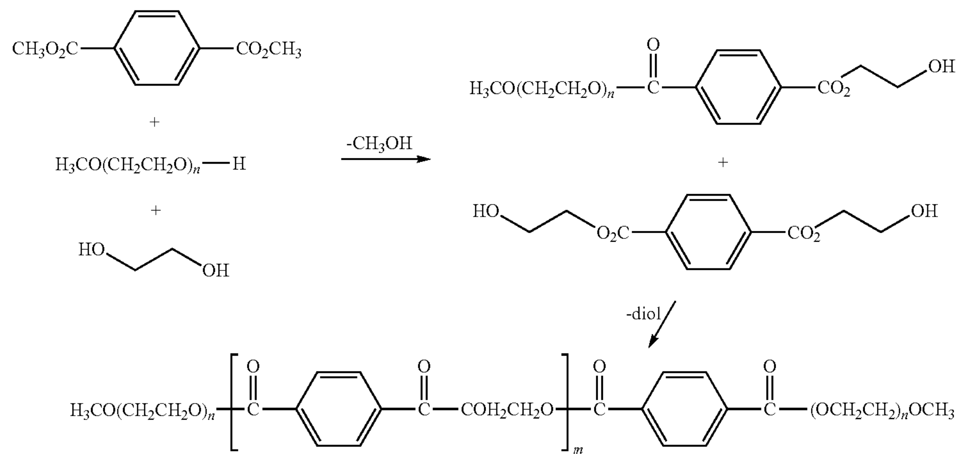

As stated in U.S. Pat. No. 6,153,723, the removal of excessive ethylene glycol at condensation stage was done at 1-5 mbar and 220-240° C. for 3-6 hours. Longer reaction time was required if the condensation was done at a higher pressure. And U.S. Pat. No. 4,703,857 described 15 hour reaction time at 200° C. and 20 mm Hg with a flow of nitrogen. On the other hand, it is difficult to control the amount of the solvent to be removed, especially when it is alkylene glycol.

DETAILED DESCRIPTION OF THE INVENTION

In the first aspect, the present invention is directed to a process for producing a polyether-polyester block copolymer, comprising:

(a) transesterification reaction of at least one di($C_1$-$C_4$)alkyl ester of aromatic dicarboxylic acid and at least one aliphatic diol or aliphatic polyol in an inert solvent, wherein the inert solvent has a boiling point higher than the boiling point of the alcohol by-product of the transesterification reaction;

(b) polycondensation reaction of the product of step (a) and one or more selected from the group consisting of at least one polyether, at least one mono-alcohol, at least one mono-carboxylic acid and at least one ester, wherein the polyether has at least one terminal hydroxyl group.

As used herein, the term "($C_1$-$C_4$)alkyl" means a monovalent saturated straight chain or branched hydrocarbon group having 1-4 carbon atoms.

As used herein, the term "di($C_1$-$C_4$)alkyl ester of aromatic dicarboxylic acid" means a dicarboxylic di($C_1$-$C_4$)alkyl ester in which the two carboxylic ester groups are each directly bound to a carbon atom of an aromatic group. The aromatic group may contain one or more aromatic rings which may be fused or unfused, and the two carboxylic ester groups may be bound to one or two different aromatic rings. The aromatic group may further be substituted by one or more other groups which do not interfere with the transesterification reaction and the polycondensation reaction, such as alkyl or alkylene.

As used herein, the term "aliphatic diol" means an aliphatic hydrocarbon compound having two hydroxyl groups in the molecule, and the term "aliphatic polyol" means an aliphatic hydrocarbon compound having at least three hydroxyl groups in the molecule.

As used herein, the term "inert solvent" means a solvent which does not interfere with the transesterification reaction of step (a) or step (b).

In the present invention, the inert solvent is used to prevent the di($C_1$-$C_4$)alkyl ester of aromatic dicarboxylic acid from sublimation because such sublimation would generate solid crystalline materials, which disrupts the process. The solvent would also help drive out alcohol by-product of lower boiling point, which will shorten the process time for making end-capped polyesters.

In one preferred embodiment of the present invention, the amount of the aliphatic diol or aliphatic polyol is 1-1.1 times the stoichiometric amount required for the preparation of the polyether-polyester. In this way, most likely, one ester group of the di($C_1$-$C_4$)alkyl ester of aromatic dicarboxylic acid is subject to the transesterification reaction directly building up the polymer instead of through the usual bis(diol or polyol) ester of the aromatic dicarboxylic acid (e.g. bis(hydroxyethyl)terephthalate). And there is substantially no free aliphatic diol or aliphatic polyol in the reaction system. Moreover, little aliphatic diol or aliphatic polyol is produced from the polycondensation reaction. Therefore, there is no need to remove the aliphatic diol or aliphatic polyol of high boiling point (e.g. ethylene, glycol or propylene glycol) under high vacuum and high temperature. At the same time, the by-product of the polycondensation reaction, i.e. the ($C_1$-$C_4$)alkyl alcohol (e.g. methanol) has a boiling point far lower than those of the aliphatic diol or aliphatic polyol, which makes them easy to be removed from the reaction system under the help of refluxing inert solvent.

In one embodiment of the present invention, the polyether is added in step (a).

In one embodiment of the present invention, the reaction temperature of step (a) is 180-270° C., preferably 190-230° C.

In one preferred embodiment of the present invention, the inert solvent has a boiling point below or equal to the reaction temperature of step (a). Preferably the inert solvent has a boiling point of 100-240° C., more preferably, 150-210° C.

In one preferred embodiment of the present invention, the inert solvent is one or more selected from the group consisting of diethylene glycol di($C_1$-$C_4$)alkyl ethers and dipropylene glycol di($C_1$-$C_4$)alkyl ethers which are environmentally benign solvents. Preferably, the inert solvent is diethylene glycol dimethyl ether, dipropylene glycol dimethyl ether or diethylene glycol diethyl ether.

In one preferred embodiment of the present invention, the amount of the said inert solvent is 0.5-40% of the batch size of step (a), which can effectively prevent the di($C_1$-$C_4$)alkyl ester of aromatic dicarboxylic acid from sublimation and does not slow down the reaction.

In one embodiment of the present invention, the inert solvent is removed by distillation under vacuum before or after step (b).

In one embodiment of the present invention, step (b) comprises sparging an inert gas into the reactant of step (b) at 180-230° C. Preferably, the inert gas is nitrogen, argon or carbon dioxide.

In one preferred embodiment of the present invention, step (a) and step (b) are carried out in the presence of at least one transesterification catalyst. Preferably, the transesterification catalyst is one or more selected from the group consisting of organic titanium catalysts such as titanium tetraisopropylate, organic tin catalysts, calcium acetoacetonate, zinc acetate and calcium hypophosphite.

In one embodiment of the present invention, the di($C_1$-$C_4$) alkyl ester of aromatic dicarboxylic acid is one or more selected from the group consisting of dimethyl esters, diethyl esters, dipropyl esters and dibutyl esters of orthophthalic acid, terephthalic acid, isophthalic acid, 5-sulfoisophthalic acid, 1,2-naphthalene dicarboxylic acid, 1,4-naphthalenedicarboxylic acid, 1,5-naphthalenedicarboxylic acid, 1,6-naphthalenedicarboxylic acid, 1,7-naphthalenedecarboxylic acid, 1,8-naphthalenedicarboxylic acid, 2,3-naphthalenedicarboxylic acid, 2,6-naphthalenedicarboxylic acid, and 2,7-naphthalenedicarboxylic acids.

In one embodiment of the present invention, the aliphatic diol is one or more selected from the group consisting of $C_2$-$C_{12}$ aliphatic diols, and the aliphatic polyol is one or more selected from the group consisting of $C_3$-$C_{12}$ aliphatic triols. More preferably, the aliphatic diol is one or more selected from the group consisting of ethylene glycol, 1,2-propylene glycol, 1,3-propylene glycol, 1,2-butylene glycol, 1,4-butylene glycol, 1,5-pentanediol, 1,6-hexanediol, 1,8-octanediol, 1,2-decanediol, 1,2-dodecanediol and neopentylene glycol.

In one preferred embodiment of the present invention, the polyether has an average molecular weight of 750-5000. Preferably, the polyether is one or more selected from the group consisting of:

(1) polyethylene glycol, poly-1,2-propylene glycol, poly-1,3-propylene glycol, and copolymers thereof; and (2) mono ($C_1$-$C_4$)alkyl ethers of the polyethers in (1).

In one preferred embodiment of the present invention, the di($C_1$-$C_4$)alkyl ester of aromatic dicarboxylic acid is one or more selected from the group consisting of dimethyl terephthalate, dimethyl isophthalate and dimethyl 5-sulfoisophthalate;

the aliphatic diol is one or more selected from the group consisting of ethylene glycol and 1,2-propylene glycol;

and the polyether is one or more selected from the group consisting of:

(1) polyethylene glycol, poly-1,2-propylene glycol, and block copolymers thereof; and (2) mono-($C_1$-$C_4$)alkyl ethers of the polyethers in (1).

In one more preferred embodiment of the present invention, the di($C_1$-$C_4$)alkyl ester of aromatic dicarboxylic acid is dimethyl terephthalate;

the aliphatic diol is one or more selected from the group consisting of ethylene glycol and 1,2-propylene glycol;

and the polyether is one or more selected from the group consisting of MPEG of MW 750, PEG of MW 600, PEG of MW 1000, PEG of MW 1500, MPEG-b-PPG of MW 750, PPG-b-PEG-b-PPG of MW 1000 and PPG-b-PEG-b-PPG of MW 1500, where MPEG is methoxy polyethylene glycol, PEG is polyethylene glycol, PPG is polypropylene glycol.

In the second aspect, the present invention is directed to the polyether-polyester block copolymer produced by the aforesaid process of the present invention.

In the third aspect, the present invention is directed to the use of the polyether-polyester block copolymer produced by the process of the present invention as a soil release agent.

EXAMPLES

Example 1

A three-neck flask equipped with magnetic/mechanic stirrer, 40 cm packed fraction column, thermometer and $N_2$ gas inlet pipe, was charged with 29.5 g of dimethyl terephthalate (DMT), 6.10 g of 1,2-propylene glycol (PG), 0.20 g of potassium acetate (KAc), 115 g polyethylene glycol monomethyl ether of molecular weight 750 (MPEG-750), 26.0 g diethylelene glycol diethyl ether (DEG-di-Et) and 0.2 g titanium tetraisopropylate (TPT). The reaction was first carried out at atmospheric pressure at 200° C. for 4 hours under nitrogen purge and methanol was collected via a fractional column. The reaction was then continued under vacuum of about 10 mbar at 210° C. for 6 hours and diethylene glycol diethyl ether was collected. Finally, nitrogen sparge rather than vacuum was used toward the end of the reaction.

Example 2

The charges of raw materials are listed in Table 1. Similar procedure to Example 1 was followed except that the reaction was carried out at 200° C. for 4 hours and subsequently at 215° C. till completion.

Examples 3-17

The charges of raw materials are listed in Table 1. The reaction was carried out at 205-215° C. with stirring and nitrogen sparge as indicated in the table while collecting methanol by-product. The reaction was continued at the reaction temperature until C-13 NMR showed completion, which took 12 to 36 hours under $N_2$ sparge. Diethylene glycol diethyl ether could be removed after 7-12 hours of reaction under vacuum, and the reaction was then continued under nitrogen sparge or under vacuum till completion. After the reaction, the mixture was cooled to room temperature to yield the product.

Example 18

Same process as Example 3 was followed except that 1.0 grams of ethylene glycol was added to the reaction charges as listed in Table 1.

Examples 19-20

The charges of raw materials are listed in Table 1. Same process as Example 3 was followed and the reaction was done at 225° C. Tyzor TPT was divided into two equal portions, one portion added at the beginning of the reaction and the other added after 7.5 hours of reaction.

Example 21

The charges of raw materials are listed in Table 1. Same process as Example 19 was followed except that the reaction was carried out at 205° C.

Example 22

The charges of raw materials are listed in Table 1, where calcium hypophosphite was added as co-catalyst and color inhibitor. Procedure of Example 19 was followed and the reaction was carried out at 225° C.

Examples 23-24

The charges of raw materials are listed in Table 1, and the reaction was carried out at 215° C. with diethylene glycol dimethyl ether as solvent.

Example 25

36.7 g dimethyl terephthalate (DMT), 9.08 g 1,2-propylene glycol (PG), 0.30 g potassium acetate (KAc), 9.0 g diethylelene glycol diethyl ether and 0.4 g titanium tetraisopropylate were charged to a 250 ml three-neck flask with magnetic stirrer, 40 cm fraction column, thermometer and $N_2$ gas inlet pipe. The mixture was rendered inert with nitrogen sparge and heated gradually to 215° C. in 150 min while methanol was distilled. The mixture was then cooled to 150° C. and 110 g MPEG-750 was charged. The reaction then continued in the same way as in one-step process as described above.

Example 26

Same solvent and same process as Example 25 were used except that the reaction was carried out at 225° C.

Examples 27-28

The charges of raw materials are listed in Table 1, and same process as shown in Example 3 was followed, except that calcium acetoacetonate ($Ca(acac)_2$) instead of Tyzor TPT was used as catalyst.

Examples 29-30

Methyl poly(ethylene glycol)-b-poly(propylene glycol) (MW 750 with 2 mole of propylene glycol) was used instead of MPEG. The charges are listed in Table 2. Procedure of Example 3 was followed.

Examples 31-32

Methyl poly(ethylene glycol)-b-poly(propylene glycol) (MW 750 with 1 mole of propylene glycol) was used instead of MPEG. Calcium acetonacetonate and Tyzor TPT were used to push the reaction. The charges are listed in Table 2. Procedure of Example 3 was followed.

Example 33

Triblock polyglycol of poly(propylene glycol)-b-poly(ethylene glycol)-b-poly(propylene glycol) (PO-EO-PO, MW 1000 with 2 moles of PO) was used instead of methyl polyethylene glycol. The charges are listed in Table 3. Procedure of Example 3 was followed.

Example 34

Triblock polyglycol of poly(propylene glycol)-b-poly(ethylene glycol)-b-poly(propylene glycol) (PO-EO-PO, MW 1000 with 3 moles of PO) was used instead of methyl polyethylene glycol. The charges are listed in Table 3. Procedure of Example 3 was followed.

Example 35

Triblock polyglycol of poly(propylene glycol)-b-poly(ethylene glycol)-b-poly(propylene glycol) (PO-EO-PO, MW 1500 with 2 moles of PO) was used instead of methyl polyethylene glycol. The charges are listed in Table 3. Procedure of Example 3 was followed.

Examples 36-37

Triblock polyglycol of poly(propylene glycol)-b-poly(ethylene glycol)-b-poly(propylene glycol) (PO-EO-PO, MW 1500 with 2 moles of PO) was used instead of methyl polyethylene glycol. The charges are listed in Table 3. Procedure of Example 25 was followed at the temperature specified in Table 3.

Examples 38-46

Polyethylene glycol of the specified molecular weight was used instead of MPEG, together with ethylene glycol or/and propylene glycol. Raw material charges are listed in Table 4. Procedure of Example 3 was followed and the reaction was done at 215° C.

Examples 47-49

Polyethylene glycol of the specified molecular weight was used instead of MPEG, together with ethylene glycol or/and propylene glycol. Raw material charges are listed in Table 4. Procedure of Example 25 was followed and the reaction was done at 215° C.

TABLE 1

| Polyether-polyester from MPEG-750 | | | | | | | |
|---|---|---|---|---|---|---|---|
| Exam # | DMT (g) | PG (g) | TPT (g) | MPEG (g) | KAc (g) | DEG-di-Et (g) | Reaction condition |
| 1 | 29.5 | 6.1 | 0.2 | 115 | 0.2 | 31 | 180-230° C. for 11 h, followed by vacuum reaction |
| 2 | 26.89 | 5.9 | 0.4 | 102.01 | 0.3 | 30 | 200° C. for 4.0 h, $N_2$ sparge for 6 h at 210° C., 10 hours after removal of solvent at 17 mbar |
| 3 | 26.9 | 5.9 | 0.2 | 102.95 | 0.3 | 39 | $N_2$ sparge for 22 h at 215° C., followed by another 4 hours after vacuum removal of solvent |
| 4 | 26.89 | 6.05 | 0.3 | 102.12 | 0.3 | 15 | $N_2$ sparge for 8.2 h at 215° C., followed by another 6 hours after vacuum removal of solvent |
| 5 | 26.92 | 6.12 | 0.4 | 102.14 | 0.3 | 15.15 | $N_2$ sparge for 11.5 h at 215° C., followed by another 8.5 hours after vacuum removal of solvent |
| 6 | 26.9 | 6.2 | 0.4 | 102.2 | 0.3 | 10 | $N_2$ sparge for 10 h at 215° C., followed by another 11 hours after vacuum removal of solvent |
| 7 | 26.9 | 6.67 | 0.4 | 90 | 0.3 | 7.2 | $N_2$ sparge for 17 h at 215° C., followed by another 6 hours after vacuum removal of solvent |
| 8 | 26.9 | 6.28 | 0.4 | 90 | 0.3 | 6 | $N_2$ sparge for 14 h at 215° C., followed by another 11 hours after vacuum removal of solvent |
| 9 | 39 | 10 | 0.4 | 110 | 0.3 | 10 | $N_2$ sparge for 20 h at 215° C., followed by another 2 hours after vacuum removal of solvent |
| 10 | 27 | 6.1 | 0.2 | 60 | 0.2 | 6 | 225° C., 1 shot of TPT |
| 11 | 27 | 6.1 | 0.2 | 60 | 0.2 | 6 | 205° C., 1 shot TPT |
| 12 | 36.7 | 9.08 | 0.3 | 110 | 0.3 | 10 | $N_2$ sparge for 12.50 h at 225° C., followed by another 6.5 hours after vacuum removal of solvent |
| 13 | 167 | 41.3 | 2.1 | 500 | 1.5 | 45 | $N_2$ sparge for 13 h at 225° C. |
| 14 | 33.4 | 8.26 | 0.05 | 100 | 0.3 | 8 | 50 mg TPT for 26 h at 225° C. |
| 15 | 33.4 | 8.26 | 0.05 | 100 | 0.3 | 8 | 50 mg TPT and 50 mg $PO(Bu)_3$ for 26 h at 225° C. |
| 16 | 33.4 | 8.26 | 0.1 | 100 | 0.3 | 8 | 100 mg TPT for 26 h at 225° C. |
| 17 | 33.4 | 8.26 | 0.1 | 100 | 0.3 | 8 | 100 mg TPT and 100 mg $Ca(PO_2)_2$ for 24 h at 225° C. |
| 18[1] | 26.9 | 4.3 | 0.4 | 102.2 | 0.3 | 8 | $N_2$ sparge for 17 h at 215° C., followed by another 7 hours after vacuum removal of solvent |
| 19 | 19.33 | 4.67 | 0.054 | 60 | 0.2 | 6 | 27 mg TPT reacted for 7.5 h and another 27 mg TPT for additional 7 h at 225° C. |
| 20 | 27 | 6.1 | 0.6 | 60 | 0.2 | 6 | 225° C., 2 shots of TPT |
| 21 | 27 | 6.1 | 0.6 | 60 | 0.2 | 6 | 205° C., 2 shots of TPT |
| 22[2] | 33.4 | 8.26 | 0.10 | 100 | 0.3 | 8 | 100 mg TPT and 100 mg $Ca(PO_2)_2$ for 24 h at 225° C. |
| 23 | 26.9 | 5.52 | 0.4 | 90 | 0.3 | 7.5[3] | $N_2$ sparge for 17 h at 215° C., followed by another 7 hours after vacuum removal of solvent |
| 24 | 36.7 | 9.08 | 0.4 | 110 | 0.3 | 10[3] | $N_2$ sparge for 17 h at 215° C., followed by another 7 hours after vacuum removal of solvent |
| 25 | 36.7 | 9.08 | 0.4 | 110 | 0.3 | 9 | $N_2$ sparge for 21 h at 215° C. |
| 26 | 52 | 13.2 | 0.4 | 150 | 0.4 | 8 | $N_2$ sparge for 19.5 h at 225° C. |
| 27 | 29 | 7 | 1.5[4] | 90 | 0.3 | 9 | 1.5 g $Ca(acac)_2$ catalyst, $N_2$ sparge for 14 h at 225° C. |
| 28 | 29 | 7 | 0.58[4] | 90 | 0.3 | 9 | 0.58 g $Ca(acac)_2$ at 230° C. for 36 h |

[1]Ethylene glycol 1.0 gram was added

[2]Calcium hypophosphite was added as color inhibitor and co-catalyst

[3]Diethylene dimethyl ether was used as solvent instead of diethylene glycol diethyl ether

[4]Calcium acetoacetonate was used as catalyst

TABLE 2

Polyether-polyester from methyl poly(ethylene glycol)-b-poly(propylene glycol), MW 750

| Exam # | DMT (g) | PG (g) | TPT (g) | Polyglycol type | Polyglycol Wt (g) | KAc (g) | DEG-Di-Et (g) | Reaction condition |
|---|---|---|---|---|---|---|---|---|
| 29 | 26.9 | 6.3 | 0.4 | 2 mole PO | 112 | 0.3 | 9 | $N_2$ sparge for 15.5 h at 215° C., followed by another 13 hours after vacuum removal of solvent |
| 30 | 29.5 | 6.1 | 0.2 | 2 mole PO | 116.15 | 0.2 | 26 | 210° C. for 4.5 hour, then with vacuum at 2 mbar for 5.5 hours |
| 31 | 30 | 5.9 | 0.4 | 1 mole PO | 110 | 0.3 | 10 | $N_2$ sparge for 13.5 h at 215° C., followed by another 9.5 hours after vacuum removal of solvent |
| 32 | 138 | 27.8 | 1.8[5] | 1 mole PO | 500 | 1.5 | 25 | 1.8 g Ca(acac)$_2$ for 8 h; TPT 0.2 g, 8 h, 0.2 g TPT for additional 12 h at 225° C. |

[5] A combination of calcium acetoactonate and tyzor TPT was used

TABLE 3

Polyether-polyester from poly(propylene glycol)-b-poly(ethylene glycol)-b-poly(propylene glycol)

| Exam # | DMT (g) | PG (g) | TPT (g) | Polyglycol type | Polyglycol Wt (g) | KAc (g) | Solvent (g) | Reaction condition |
|---|---|---|---|---|---|---|---|---|
| 33 | 26.9 | 6.85 | 0.4 | (PO)—(EO)$_{20}$—(PO) | 102.2 | 0.3 | 10[6] | $N_2$ sparge for 12.5 h at 215° C., followed by another 3 hours after vacuum removal of solvent |
| 34 | 28 | 6.6 | 0.4 | (PO)$_{1.5}$—(EO)$_{19}$(PO)$_{1.5}$ | 130 | 0.3 | 13 | $N_2$ sparge for 24 h at 215° C., followed by another 7 hours after vacuum removal of solvent |
| 35 | 30 | 8.7 | 0.4 | (PO)—(EO)$_{31}$—(PO) | 130 | 0.3 | 10 | $N_2$ sparge for 14 h at 215° C., followed by another 13 hours after vacuum removal of solvent |
| 36 | 30 | 8.7 | 0.4 | (PO)—(EO)$_{31}$—(PO) | 130 | 0.3 | 10 | $N_2$ sparge for 2.5 h at 215° C., followed added polyether by another 18 hours |
| 37 | 30 | 9.4 | 0.4 | (PO)—(EO)$_{31}$—(PO) | 100 | 0.3 | 10 | $N_2$ sparge for 20 h at 225° C. |

[6] Diethylene dimethyl ether was used assolvent instead of diethylene glycol diethyl ether

TABLE 4

Polyether-polyester from polyethylene glycol

| Exam # | DMT (g) | PG (g) | TPT (g) | EG (g) | Polyglycol type | Polyglycol Wt (g) | KAc (g) | Solvent (g) | Reaction condition |
|---|---|---|---|---|---|---|---|---|---|
| 38 | 20 | 0 | 0.4 | 4.6 | PEG 1500 | 90 | 0.3 | 8 | $N_2$ sparge for 11 h at 215° C., |
| 39 | 20 | 5.5 | 0.4 | 0 | PEG 1500 | 93 | 0.3 | 8 | $N_2$ sparge for 13 h at 215° C., |
| 40 | 20 | 2.8 | 0.4 | 2.3 | PEG 1500 | 90 | 0.3 | 8 | $N_2$ sparge for 13.5 h at 215° C., |
| 41 | 20 | 4.4 | 0.4 | 1 | PEG 1500 | 90 | 0.3 | 8 | $N_2$ sparge for 13 h at 215° C., |
| 42 | 21.5 | 5.4 | 0.4 | 0 | PEG1000 | 80 | 0.3 | 10 | $N_2$ sparge for 10 h at 215° C., followed by another 5 hours after vacuum removal of solvent |
| 43 | 21.5 | 6.4 | 0.4 | 0 | PEG1500 | 80 | 0.3 | 10 | $N_2$ sparge for 10 h at 215° C., followed by another 3 hours after vacuum removal of solvent |
| 44 | 26.5 | 0 | 0.4 | 6.5 | PEG1500 | 100 | 0.3 | 10 | $N_2$ sparge for 14 h at 215° C., |
| 45 | 48.5 | 0 | 0.4 | 9.61 | PEG600 | 60 | 0.4 | 10 | $N_2$ sparge for 22 h at 215° C., |
| 46 | 20 | 0 | 4.6 | 4.6 | PEG1500 | 90 | 0.3 | 9 | $N_2$ sparge for 11 h at 215° C. |
| 47 | 33 | 8.6 | 0.4 | 0 | PEG1000 | 120 | 0.3 | 10 | $N_2$ sparge for 13.5 h at 215° C., |
| 48 | 41.5 | 12 | 0.4 | 0 | PEG1000 | 120 | 0.4 | 10 | $N_2$ sparge for 19 h at 215° C., |
| 49 | 34 | 0 | 0.4 | 8 | PEG1000 | 100 | 0.3 | 10 | $N_2$ sparge for 15 h at 215° C., |

The invention claimed is:

1. A process for producing a polyether-polyester block copolymer, comprising:

(a) carrying out a transesterification reaction of at least one di($C_1$-$C_4$)alkyl ester of an aromatic dicarboxylic acid and at least one aliphatic diol or aliphatic polyol in an inert solvent to obtain a product of step (a) and an alcohol by-product, wherein the inert solvent, having a boiling point higher than the boiling point of the alcohol by-product, is one or more selected from the group consisting of diethylene glycol di($C_1$-$C_4$)alkyl ethers, and dipropylene glycol di($C_1$-$C_4$)alkyl ethers; and (b) carrying out a polycondensation reaction of the product of step (a) and at least one polyether to obtain the polyether-polyester block copolymer, wherein the polyether has at least one terminal hydroxyl group.

2. The process according to claim 1, wherein the amount of the aliphatic diol or aliphatic polyol is 1-1.1 times the stoichiometric amount required for the production of the polyether-polyester block copolymer.

3. The process according to claim 1, wherein the polyether is added in step (a).

4. The process according to claim 1, wherein the reaction temperature of step (a) is 180-270° C.

5. The process according to claim 1, wherein the reaction temperature of step (a) is 190-230° C.

6. The process according to claim 1, wherein the inert solvent has a boiling point below or equal to the reaction temperature of step (a).

7. The process according to claim 1, wherein the inert solvent has a boiling point of 100-240° C.

8. The process according to claim 1, wherein the inert solvent has a boiling point of 150-210° C.

9. The process according to claim 1, wherein the inert solvent is diethylene glycol dimethyl ether, dipropylene glycol dimethyl ether or diethylene glycol diethyl ether.

10. The process according to claim 1, wherein the amount of the inert solvent is 0.5-40% of the batch size of step (a).

11. The process according to claim 1, wherein the inert solvent is removed by distillation under vacuum before or after step (b).

12. The process according to claim 1, wherein step (b) comprises sparging an inert gas into the reactant of step (b) at 180-230° C.

13. The process according to claim 12, wherein the inert gas is nitrogen, argon or carbon dioxide.

14. The process according to claim 1, wherein step (a) and step (b) are carried out in the presence of at least one transesterification catalyst.

15. The process according to claim 14, wherein the transesterification catalyst is one or more selected from the group consisting of titanium tetraisopropylate, calcium acetoacetonate and calcium hypophosphite.

16. The process according to claim 1, wherein the di($C_1$-$C_4$)alkyl ester of aromatic dicarboxylic acid is one or more selected from the group consisting of dimethyl esters, diethyl ester, dipropyl ester and dibutyl ester of orthophthalic acid, terephthalic acid, isophthalic acid, 5-sulfoisophthalic acid, 1,2-naphthalene dicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid.

17. The process according to claim 1, wherein the aliphatic diol is one or more selected from the group consisting of $C_2$-$C_{12}$ aliphatic diols, and the aliphatic polyol is one or more selected from the group consisting of $C_3$-$C_{12}$ aliphatic triols.

18. The process according to claim 1, wherein the aliphatic diol is one or more selected from the group consisting of ethylene glycol, 1,2-propylene glycol, 1,3-propylene glycol, 1,2-butylene glycol, 1,4-butylene glycol, 1,5-pentanediol, 1,6-hexanediol, 1,8-octanediol, 1,2-decanediol, 1,2-dodecanediol and neopentylene glycol.

19. The process according to claim 1, wherein the polyether has an average molecular weight of 750-5000.

20. The process according to claim 1, wherein the polyether is one or more selected from the group consisting of:

(1) polyethylene glycol, poly-1,2-propylene glycol, poly-1,3-propylene glycol, and copolymers thereof; and (2) mono ($C_1$-$C_4$)alkyl ethers of the polyethers in (1).

21. The process according to claim 1, wherein the di($C_1$-$C_4$)alkyl ester of aromatic dicarboxylic acid is one or more selected from the group consisting of dimethyl terephthalate, dimethyl isophthalate and dimethyl 5-sulfoisophthalate; the aliphatic diol is one or more selected from the group consisting of ethylene glycol and 1,2-propylene glycol; and the polyether is one or more selected from the group consisting of: (1) polyethylene glycol, poly-1,2-propylene glycol, and block copolymers thereof; and (2) mono-($C_1$-$C_4$)alkyl ethers of the polyethers in (1).

22. The process according to claim 1, wherein the di($C_1$-$C_4$)alkyl ester of aromatic dicarboxylic acid is dimethyl terephthalate; the aliphatic diol is one or more selected from the group consisting of ethylene glycol and 1,2-propylene glycol; and the polyether is one or more selected from the group consisting of MPEG of MW 750, PEG of MW 600, PEG of MW 1000, PEG of MW 1500, MPEG-b-PPG of MW 750, PPG-b-PEG-b-PPG of MW 1000 and PPG-b-PEG-b-PPG of MW 1500.

* * * * *